United States Patent
Tsirkin

(10) Patent No.: US 11,163,350 B2
(45) Date of Patent: Nov. 2, 2021

(54) APPLICATION POWER MANAGEMENT FOR MOBILE DEVICES

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 168 days.

(21) Appl. No.: 16/421,118

(22) Filed: May 23, 2019

(65) Prior Publication Data

US 2020/0371576 A1    Nov. 26, 2020

(51) Int. Cl.
*G06F 1/3206* (2019.01)

(52) U.S. Cl.
CPC .................................. *G06F 1/3206* (2013.01)

(58) Field of Classification Search
CPC ...................................................... G06F 1/3206
See application file for complete search history.

(56) References Cited

U.S. PATENT DOCUMENTS

| | | | |
|---|---|---|---|
| 4,236,880 A | 12/1980 | Archibald | |
| 10,114,439 B2* | 10/2018 | Bluestein | G06F 1/3212 |
| 10,114,440 B2 | 10/2018 | Chan et al. | |
| 2009/0094473 A1* | 4/2009 | Mizutani | G06F 1/3203 713/340 |
| 2010/0145643 A1* | 6/2010 | Katpelly | G06F 1/329 702/63 |
| 2011/0082621 A1 | 4/2011 | Berkobin et al. | |
| 2013/0067263 A1* | 3/2013 | Liu | G06F 1/3212 713/340 |
| 2014/0024416 A1* | 1/2014 | Xie | H04W 52/0261 455/574 |
| 2014/0281608 A1* | 9/2014 | Yin | G06F 1/3212 713/320 |
| 2015/0156307 A1* | 6/2015 | Kim | H04W 52/0264 455/566 |
| 2017/0371394 A1* | 12/2017 | Chan | G06F 1/3218 |
| 2018/0145514 A1 | 5/2018 | Prabhakar et al. | |
| 2018/0262016 A1 | 9/2018 | Baughman et al. | |

FOREIGN PATENT DOCUMENTS

| | | |
|---|---|---|
| EP | 3444788 A1 | 2/2019 |
| WO | 2018 069746 A1 | 4/2019 |

OTHER PUBLICATIONS

Huoran Li, Xuanzhe Liu, Qiaozhu Mei; "Predicting Smartphone Battery Life based on Comprehensive and Real-time Usage Data"; Peking University, University of Michigan; Published Jan. 15, 2018; (22 Pages).
GSam Labs; "GSam Battery Monitor—Users Guide"; Users Guide (Version 3.35); Published Dec. 18, 2017; (51 Pages).

* cited by examiner

*Primary Examiner* — Gary Collins
(74) *Attorney, Agent, or Firm* — K&L Gates LLP

(57) ABSTRACT

Application power management for mobile devices is disclosed. For example, at least one application is installed that reports a target time for which it requires power. The request is received, an active target time is determined and a current charge, operating system requirements, current component power usages, and component performance parameters are obtained. A remaining battery life may be determined that is less than the target time. Application component requirements are received and component parameter reductions are determined based on these requirements. A plurality of allowable power reduction options are determined that may be executed to maintain battery power for at least as long as the target time.

20 Claims, 9 Drawing Sheets

APPLICATION POWER MANAGEMENT FOR MOBILE DEVICES

BACKGROUND

Mobile devices are powered by a battery, typically located within the mobile device. Because the mobile device requires power from this battery to function, there is a need for the mobile device to use the power efficiently and conserve the power when necessary. As such, mobile devices may routinely perform power management actions. When a mobile device is running low on power, a power saving mode may be engaged, diminishing the performance of certain aspects of the mobile device to preserve battery power. These power saving actions may be performed by a processor, an operating system, or an application. Furthermore, instructions to execute the actions, within the processor, operating system, or application, may be stored within the memory of the mobile devices.

SUMMARY

The present disclosure provides new and innovative systems and methods for application power management for mobile devices. In an example, a method includes installing, by a mobile device comprising a plurality of hardware components, at least one application configured to report at least one target time for which the at least one application requires power from a device battery. At least one target time is received from the at least one application. An active target time is determined based on the at least one target time. Additionally, a plurality of operating system requirements, a current charge of the device battery, a plurality of current component power usages, and a plurality of current component performance parameters are obtained, and an instantaneous power usage is determined based on the plurality of current component power usages. Furthermore, a remaining battery life of the device battery is determined based on at least the current charge and the instantaneous power usage. Additionally, the method includes determining that the active target time is greater than the remaining battery life. A plurality of application component requirements are requested and received from the at least one application. In addition, at least one component parameter reduction is determined based on at least the plurality of application component requirements. A plurality of allowable power reduction options is determined based on at least the at least one component parameter reduction and the plurality of operating system requirements.

In an example, a system comprises a mobile device comprising a plurality of hardware components comprising a battery, at least one application configured to report at least one target time for which the at least one application requires power from a device battery, a plurality of hardware components, and a power manager. The power manager may be configured to receive the at least one target time from the at least one application, determine an active target time based on the at least one target time, obtain a plurality of operating system requirements, a current charge of the device battery, a plurality of current component power usages, and a plurality of current component performance parameters, determine an instantaneous power usage based on the plurality of current component power usages, determine a remaining battery life of the device battery based on at least the current charge and the instantaneous power usage, determine that the active target time is greater than the remaining battery life, request and receive a plurality of application component requirements from the at least one application, determine at least one component parameter reduction based on at least the plurality of application component requirements, and determine a plurality of allowable power reduction options based on at least at least one component parameter reduction and the plurality of operating system requirements.

In an example, a non-transitory, computer-readable medium storing instructions which, when performed by a processor, cause the processor to install at least one application configured to report at least one target time for which the at least one application requires power from a device battery. The instructions also cause the processor to receive the at least one target time from the at least one application. The processor will also be caused to determine an active target time based on the at least one target time. Subsequently, the instructions cause the processor of the system to obtain a plurality of operating system requirements, a current charge of the device battery, a plurality of current component power usages, and a plurality of current component performance parameters determine an instantaneous power usage based on the plurality of current component power usages. The processor is also caused to determine a remaining battery life of the device battery based on at least the current charge and the instantaneous power usage. In addition, the processor determines that the active target time is greater than the remaining battery life. Furthermore, the processor requests and receives a plurality of application component requirements from the at least one application. Additionally, the processor also determines at least one component parameter reduction based on at least the plurality of application component requirements. Furthermore, the processor determines a plurality of allowable power reduction options based on at least on at least the at least one component parameter reduction and the plurality of operating system requirements Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
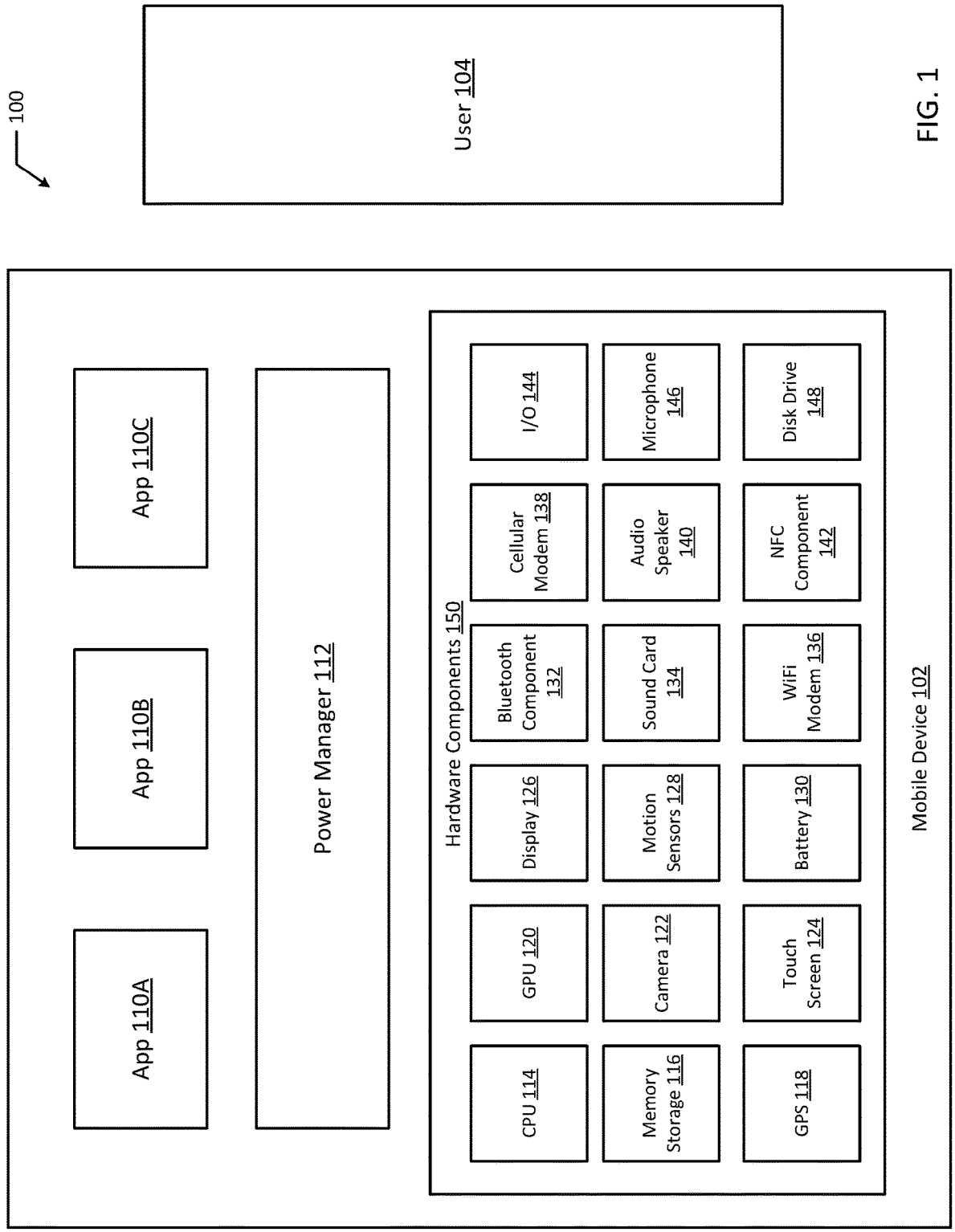
FIG. 1 illustrates a block diagram of an example system according to an example embodiment of the present disclosure.

In mobile devices, power management techniques may be implemented to allow the mobile device to conserve battery power when, for example, it is known that the device will not be able to be charged before the battery runs out of power. In an example, a mobile device may be a cell phone. The cell phone relies on the battery to function and therefore may monitor the charge of the battery to alert a user when the battery is low. In an example, the cell phone may notify the user that the battery charge has fallen below 15% and recommend charging the device or to enable a power saving mode. For example, the power saving mode could dim the screen and reduce the processor power, both of which are predetermined measures that do not rely on the current function of the phone, including any user requested tasks. For example, when a power saving mode is initiated, the screen may reduce brightness to 30% of its maximum brightness, and reduce processor speed to 30% of its maximum. A with such a solution is that there is no consideration of the current use case of the mobile device.

Though reducing power consumption by a predetermined amount can extend the battery life of the device, there are times when such measures are not enough. For example, a user, making use of the mobile device, may begin a task that must be completed by the device before the battery power is depleted. For example, a user may request that an application on the mobile device provide navigation to a coordinate. The navigation to the coordinate may not be possible with the remaining battery and the current operation of the mobile device. Even if the user initiates a power-saving mode, as discussed above, the battery may still deplete before the navigation completes because it will only perform a list of predetermined power reductions, stranding the user in a possibly unknown location with no guidance to reach the desired destination.

The present disclosure aims to address the issues associated with the depletion of a mobile device's battery before requested tasks are completed. Techniques are disclosed for application power management of mobile devices. In an example, the mobile device includes, stored on the device, multiple applications that are configured to report target times corresponding to the amount of time each respective application requires to complete a specific task. For example, a target time can be provided by a navigation app detailing that navigation to a location will take at least one hour. In an example, the mobile device also includes a power manager that can interpret these target times to prepare instructions for reducing the mobile device's power consumption by reducing at least one performance parameter, such as the brightness of the screen, slowing the network connection, and reducing audio speaker loudness, to extend battery life to the target times. In another example, the power manager may determine a best use case for the remaining power to maintain a selection of the requested functions if it is not possible to maintain every requested function. The present disclosure differs from prior solutions in how the power manager devises power consumption reductions that consider the current use case of the mobile device. Therefore, by determining power reduction options to increase battery life based on actual requests for necessary battery life, an example power manager improves upon previously existing mobile device power management by determining a use case in which the mobile device maintains battery power operation long enough to perform at least the selected functions.

FIG. 1 is a block diagram of a system configured according to an example of the present disclosure. The system 100 may include a user 104 and a mobile device 102. The user 104 may include a person, another mobile device, an external application, or any entity that can make requests of the mobile device 102. The mobile device 102 may be configured to install multiple applications 110A-C. The mobile device 102 may also include a power manager 112 and a plurality of hardware components 150. Though FIG. 1 depicts a mobile device 102 that includes three applications 110A, 110B, and 110C, the mobile device 102 may include any number of applications.

The plurality of hardware components 150, may include a CPU 114, a memory storage 116, a GPS 118, a GPU 120, a camera 122, a touch screen 124, a display 126, a plurality of motion sensors 128, a battery 130, a Bluetooth component 132, a sound card 134, a WiFi modem 136, a cellular modem 138, an audio speaker 140, an NFC component 142, and I/O 144, a microphone 146, and a disk drive 148. This plurality of hardware components 150 serves only as an example of hardware components that may be found within a mobile device 102 and is not meant to be limiting as it is understood that many other hardware components may be found within a mobile device 122. Though FIG. 1 depicts the power manager 112 as separate from the hardware components 150, the power manager 112 may, in another example, be implemented through any combination of the hardware components 150. For example, the power manager 112 may be implemented through combination of the CPU 114 and memory storage 116. In another example, the power manager 112 may be a separate standalone hardware component.

In an example, during operation, the application 110A may be configured to receive tasks to complete from the user 104. Based on these tasks, the application 110A may determine at least one target time for which the application 110A will need power from a device battery 130. The application 110A may be configured to then transmit this at least one target time to the power manager 112. In another example, the application 110A may be configured as a power settings application wherein a user 104 can designate a list of applications from which to ignore target times. For example, to prevent notice of insufficient time, a user 104 may select a music playing application as one from which the target times can be ignored. As a result, even if the user 104 is using the music playing application to listen to a three-hour audio book, the power manager 112 will ignore the corresponding 3 hour target time. Furthermore, through the power settings application, a user 104 may be able to set a target time to any desired amount. For example, if the user 104 would like the mobile device 102 to remain operational for at least four hours, the user 104 can designate that time within the power settings application.

In an example, the power manager 112 may be configured to receive, from the application 110A a target time. After receiving this target time, the power manager 112 may be configured to determine an active target time based on the received target time. For example, the power manager 112 may have also received target times from each of the other applications 110B and 110C. The power manager 112 may then compare the received target times to determine which of these target times to select as the active target time. For example, the power manager 112 may select the target time that is the longest in duration of any of the received target times. In another example, the power manager 112 may be configured to select the most recently received target time as the active target time. In yet another example, the power manager 112 may be configured to select the earliest received target time. In another example, the power manager 112 may be configured to select the target time with the shortest duration. Though explicit examples have been provided, the power manager 112 may be configured to select one of the received target times as the active target time through any number of methods.

In an example, the power manager 112 may be further configured to obtain a plurality of operating system requirements, the current charge of the device battery 130, a plurality of current component power usages, and a plurality of current component performance parameters. The plurality of operating system requirements may include a plurality of minimum performance parameters containing a minimum performance parameter relating to each of the hardware components 150 that must be maintained for at least the operating system to remain functional. For example, the plurality of hardware components 150 may include a CPU 114, a GPU 120, and a display 126. The power manager 112 may obtain corresponding minimum performance parameters for each, including a minimum of 30% of the maximum processor speed for the CPU 114 (which can also be reported in, for example, GHz), 22% of the maximum processor speed for the GPU 120 (which can also be reported in clock speed of the GPU), and 15% of the max brightness for the display 126 (which may also be reported in, for example, nits or lumens). The current charge of the device battery 130 may represent the amount of power remaining in the battery. For example, the current charge may be represented as the amount of power, in joules remaining in the battery, represented in amp-hours remaining, or any other metric by which an amount of power can be described.

In an example, the plurality of current component power usages obtained by the power manager 112 may include the rate of power consumption for each of the hardware components 150. For example, as above, the plurality of hardware components 150 may include a CPU 114, a GPU 120, and a display 126. The power manager 112 may obtain corresponding current component power usages for each, including a power usage of 500 mW for the CPU 114, 150 mW for the GPU 120, and 850 mW for the display 126. In an example, power manager 112 may obtain current component performance parameters for each of the hardware components 150 that correspond to the current power usages. For example, the power manager 112 may obtain corresponding current performance parameters for each of the CPU 114, the GPU 120, and the display 126 as 45%, 56%, and 67% of their maximum performance parameters, respectively. For example, the CPU 114 may have a maximum speed of 2 GHz. In the prior example, the CPU 114 has a current power usage of 150 mW and a current performance parameter of 45%, representing that, when the CPU functions at 45% of its maximum speed of 2 GHz, in this case 900 MHz, it uses 150 mW.

In an example, the power manager 112 may be further configured to determine an instantaneous power usage for the mobile device 102. The power manager 112 may determine the usage by totaling the current component performance power usages it previously obtained. For example, based on the earlier example in which the component power usages were 500 mW for the CPU 114, 150 mW for the GPU 120, and 850 mW for the display 126, the power manager 112 can determine that the instantaneous power usage is the sum of the three powers, in this example 1500 mW.

In an example, the power manager 112 may then be configured to determine a remaining battery life of the device battery 130. For example, the power manager 112 may determine the remaining battery life based on the current charge of the device battery 130 and the instantaneous power usage previously obtained. For example, based on these values, the power manager may determine that the remaining battery life of the device battery may be one hour. Although in this example the power manager 112 determines the remaining battery life based on a mathematical relationship between the instantaneous power usage and the current charge of battery, there are many other methods, known by those of ordinary skill in the art, by which a remaining battery life can be determined.

In an example, the power manager 112 may be configured to determine that the device battery 130 will deplete before the active target time can be reached. For example, as discussed above, the remaining battery life for the device battery 130 may be one hour, yet an application 110A, and therefore the active target time, may request device operation for 75 minutes.

In an example, the power manager 112 may further be configured to request, from the plurality of applications 110A-C, and receive a plurality of application component requirements. Furthermore, the power manager 112 may notify the applications that the battery is draining too quickly under current operation conditions to reach the active target time. By this request, the power manager 112 seeks information from each application that may include which components the application requires for functionality, the target times for each of these components, and the minimum application performance parameter for these components. For example, if application 110A represents a video player, the application 110A may include with its response to the power manager 112, that it requires the CPU 114, GPU 120, audio speaker 140, and display 126 for the entire target time of 75 minutes. Although in this example, each component requires the same target time, there are other examples in which components require different target times. For example, if application 110B represents a streaming video player application, it may require the WiFi modem 136 as well as the CPU 114, GPU 120, audio speaker 140, and display 126. The WiFi modem 136 may have a target time of only 10 minutes, compared to the 75 minutes required for all other target times as the WiFi modem 136 may download the entire video to be played back in 10 minutes.

In an example, the power manager 112 may be further configured to determine at least one component parameter reduction. For example, the power manager 112 may group in a first set of groups, each of the plurality of application component requirements based on its relation to one of the plurality of required components. By grouping related application component requirements, the power manager 112 may determine a component parameter reduction that decreases the power usage of that component, yet maintains the selected functionality for each application 110A-C. For example, if application 110A, 110B, and 110C have each respectively transmitted an application component requirement for the CPU 114 for 12% of maximum its performance for 30 minutes, 20% of maximum its performance for 22 minutes, and 15% of maximum its performance for 45 minutes, respectively, the three requirements will be grouped due to their relation to the CPU 114. In another example, there will be a corresponding group of application component requirements for each of the plurality of required components. For example, if application 110A required components CPU 114, NFC component 142 and disk drive 148 while application 110B required the CPU 114, the disk drive 148, and the audio speaker 140, and the application 110C required the CPU 114, the display 126 and the touch screen 124, the power manager would create a first set of groups comprising a group for each of the CPU 114, the NFC component 142, the disk drive 148, the audio speaker 140, the display 126, and the touch screen 124. In the example, the group for the CPU 114 would contain the three CPU 114 application component requirements for each of the applications 110A-C. The group for the disk drive 148 would contain the application component requirements for each of the applications 110A and 110B and so on for the remaining required components. In the example, each group of the first set of groups contains the application component requirements for each of the required components, in some examples, the group may contain only a single application component requirement, such as the case for the group for the touch screen 124 from the prior example. An example method will later determine a second set of groups, these groups comprising power reductions options determined corresponding to this first set of groups, and the operating system requirements for the related hardware components 150. This second set of groups will be used to determine allowable power reduction options that maintain both application and operating system requirements.

Then, the power manager 112 may determine a proposed performance parameter for each of the required components. The power manager 112 may employ various processing determination techniques to determine the proposed performance parameter, including for example, using a lookup table, heuristics, or artificial intelligence. For example, using the values above, the power manager 112 may determine, by using a lookup table, that to satisfy all requirements, the proposed performance parameter for the CPU 114 should be 23% for the longest target time, 45 minutes. In the alternative, the system may determine, through use of heuristics, that the proposed performance parameter may be 23% for only the first 22 minutes, then 17% for the next 8 minutes, then 15% for the remaining 15 minutes.

In an example, the power manager 112 may be configured to determine a plurality of allowable power reduction options. Because the allowable power reduction option represents a determined decrease in power usage or a minimum power usage, the allowable power reduction option is a valid power reduction option and therefore, the term allowable and valid may be used interchangeably within this specification. Determining a plurality of allowable power reductions options may comprise determining a plurality of proposed performance parameter and a plurality of proposed power usages. For example, once the power manager 112 has determined at least one component parameter reduction, it can then group each of these component parameter reductions, in a second group, with each of the operating system requirements based on the related hardware component. For example, if a component parameter reduction is determined, based on a group from the first set of groups relating to the CPU 114, that requires the CPU 114 at 23% of maximum speed for the next 45 minutes, this same parameter reduction will be grouped with the operating system requirement detailing that the operating system requires the CPU 114 to maintain at least 15%. Once all related component parameter reductions and operating system requirements have been grouped, the power manager 112 may then determine one or more proposed performance parameters for each component. For example, as before, if the CPU 114 is required to be at least 15% at all times for the operating system, and 23% for 45 minutes, the power manager 112 may determine that the CPU 114 must maintain at least 26% performance for at least the next 45 minutes.

Such a determination may be performed by using a lookup table developed based on component testing for each device model, through artificial intelligence, or through use of another application. If there exists an operating system requirement with no corresponding component parameter reduction, or vice versa, the power manager simply sets the operating system requirement, or the component parameter reduction, respectively, as the proposed performance parameter.

In an example, if the operating system requirements do not require an audio speaker 140, but the component parameter reduction requires the audio speaker 140 at 40% performance for 15 minutes, the proposed performance parameters corresponding to the audio speaker 140 will be determined as 40% for 15 minutes. Though in the prior example, the plurality of proposed performance parameters are comprised of minimum performance parameters allowed by the system, in another example, the plurality of proposed performance parameters may include performance parameters that lie between the current component performance parameters and the minimum performance parameters. For example, the applications 110A-C may include within the plurality of application component requirements, a plurality of preferred application performance parameters along with the minimum application performance parameters. These preferred application performance parameters may require more power than the minimum application performance, but maintain a better performance margin, as determined by the application.

In an example, the power manager 112 may be configured to obtain a plurality of proposed power usages relating to each of the proposed performance parameters. For example, the power manager 112 can present a proposed performance parameter to an application 110A and obtain the proposed power usage from the application 110A, itself. In another example, the power manager 112 can obtain a corresponding proposed power usage for each proposed performance parameter through use of a lookup table. In yet another example, the power manager 112 may obtain the proposed power usages by calculating a decrease in the current component power usage based on the relative performance parameter decrease suggested by the allowable power reduction options. For example, the proposed power usage may be represented by the total amount of joules required to complete the task, the length of time and the watts required to complete the task, or any other representation of power that allows comparison to the remaining battery life of the battery 130. For example, the power manager 112 may determine a proposed performance parameter for the display 126, requiring 75 minutes of function at 25% of its maximum brightness. The power manager 112 may then consult a lookup table, stored within the mobile device 102 or accessible from an external source, to obtain information that the display 126 requires 100 mW at 25% of its maximum brightness and therefore would require 450 W, designated as the proposed power usage. In an example, one or more allowable power reduction options may be determined as the proposed performance parameter and the corresponding proposed power usage for each of the hardware components 150. In another example, the power manager 112 may determine more than one allowable power reduction option for each component, including many different proposed performance parameters that fall between the current performance parameter and a minimum performance parameter that satisfies the system power requirements.

In an example, the power manager 112 may be configured to determine whether any combination of the allowable power reduction options can be executed in order to increase the remaining battery life of the battery 130 to be at least equal to the active target time. For example, the power manager 112 may total the proposed power usages corresponding to any combination of allowable power reduction options. If determined that at least one combination does satisfy the requirement, for example, the power manager 112 may be configured to determine a preferred option combination to be executed. For example, the power manager 112 may determine the preferred option combination based on what combination reduces power consumption the most, in some cases executing every allowable power reduction option. In another example, the power manager 112 may simply execute a combination that gets closest to the active target time. For example, if the active target time is one hour, the power manager 112 may select a combination of allowable power reduction options that extends the remaining battery life to one hour and one minute, although it could select more allowable power reduction options that can extend the remaining battery life to two hours. In yet another example, the power manager 112 may determine a preferred combination of the options based on a predetermined hierarchy of reductions. For example, there may be a hierarchy stored within the device 102 that specifies that the CPU 114 performance is not reduced unless absolutely necessary, thereby removing the CPU 114 from the preferred option combination unless it is the last remaining option. Furthermore, the power manager 112 may then be configured to execute the preferred option combination, relaying commands to applications 110A-C and the hardware components 150 as needed.

In an example, the power manager 112 may determine that the execution of any combination of selections from the allowable power reduction options does not increase the remaining battery life to be at least equal to the active target time. For example, if the active target time is one hour, the power manager may determine that even after executing all allowable power reduction options, the remaining battery life may only be extended to fifty minutes. The power manager 112 may be configured to present a notification to the user 104 that the battery 130 will be depleted before the currently requested tasks are completed. Furthermore, the manager 112 may be configured to determine a plurality of selectable power options that include options beyond simply adjusting hardware performance parameters. For example, if application 110A is a navigation application attempting to navigate to a location one hour away, the power manager 112 may determine a selectable power option to be navigate to a different location, which can be reached before the battery 130 is depleted. In another example, if the application 110B is a video player application, the power manager 112 may determine a selectable power option to include ending video playback. In another example, the power manager 112 may determine a selectable power option to be to ignore the notice and continue current operation. In another example, the power manager 112 may be configured to determine the selectable power options by requesting from the applications 110A-C, new power options that comprise a change in the application 110A-C functionality and new target times. In addition, the power manager 112 may be configured to select as selectable power options, any number of options stored within the device 102 based on the current applications 110A-C. For example, there may be a lookup table containing selectable options for a navigation application that are always presented as selectable power options, such as navigate to a new location, end navigation, find similar location, or turn off screen between turns. Furthermore, the selectable power options may include options to silence the notice for a period of time, end any combination of applications, and open a settings application.

The power manager 112, may be further configured to present the selectable power options to the user 104. For example, the power manager 112 may send instructions to the display 126 to display text, detailing the need for the selectable power options and the options themselves. In another example, the power manager 112 may send instruction to the audio speaker 140 to provide audible notice of the need for the selectable power options and the options themselves.

In an example, the power manager 112 is configured to receive at least one user selected power option. For example, the power manager 112 may receive, from the touch screen 124, options picked from the selectable power options by the user 104.

In an example, the power manager 112 is further configured to execute the at least one user selected power option. For example, the user selected power options may be executed by relaying commands to applications 110A-C and the hardware components 150 as needed.

Figure 2A:
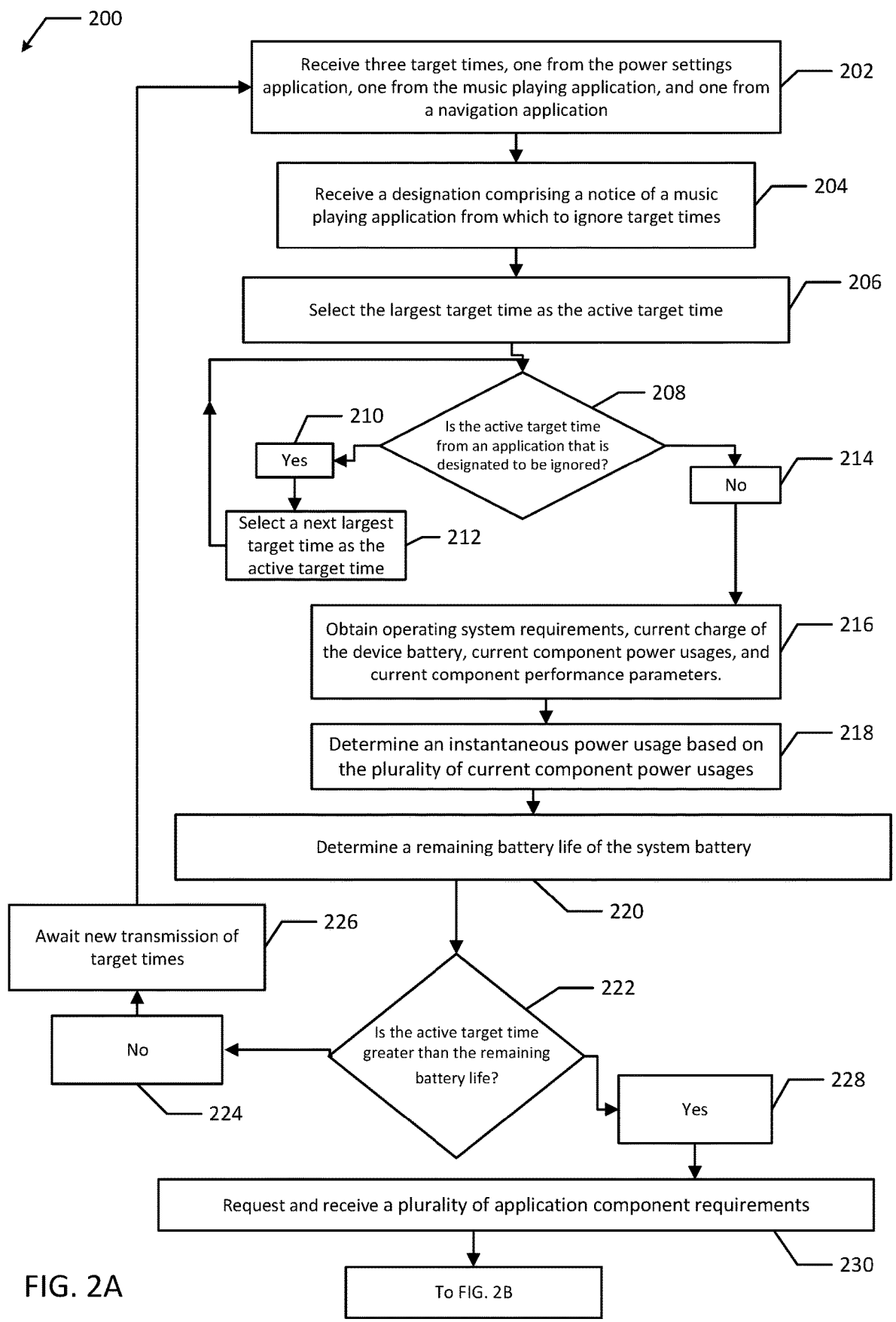
FIGS. 2A and 2B illustrates a flowchart of an example process for power management according to an example embodiment of the present disclosure.
Figure 2B:
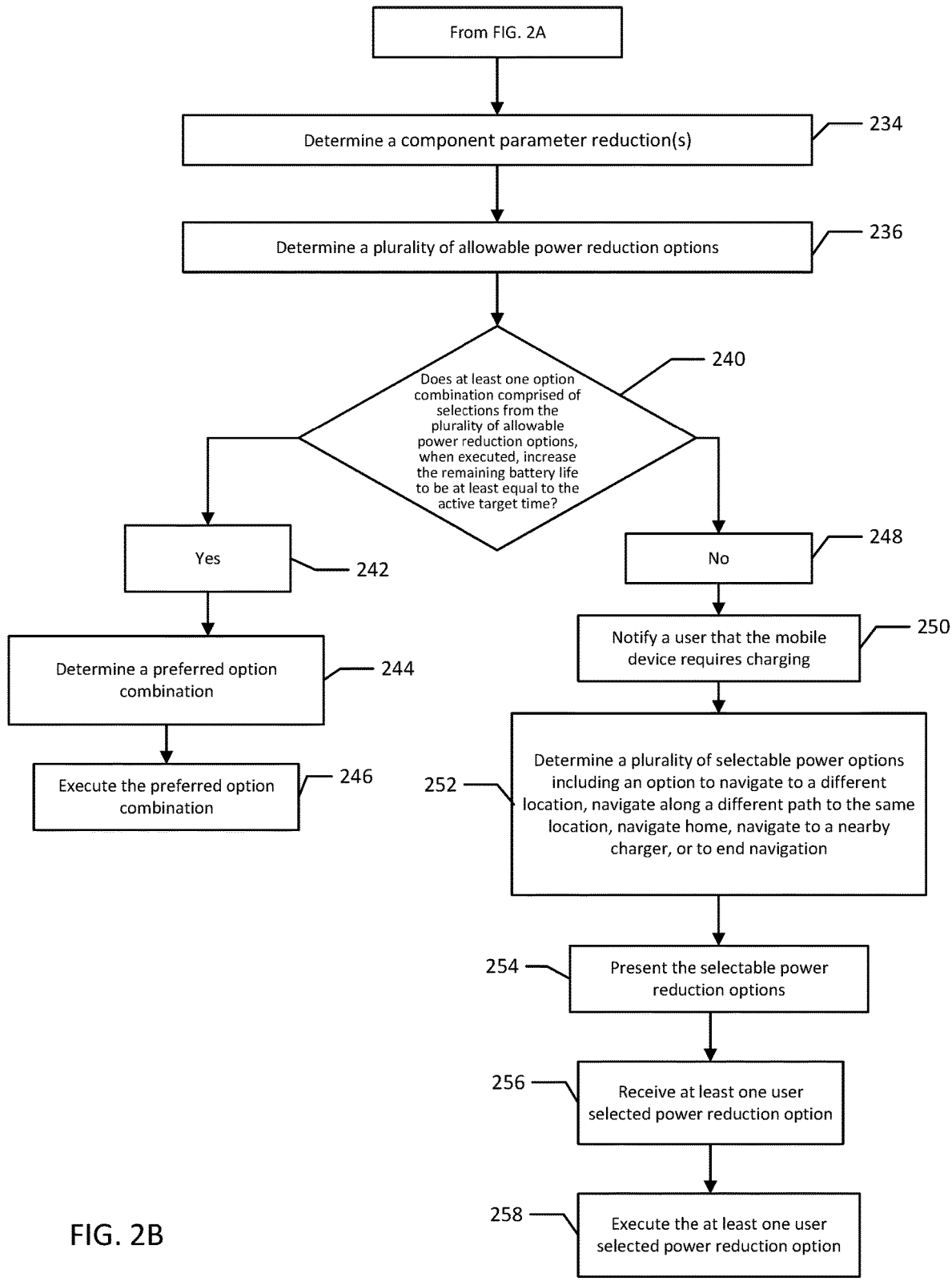

FIGS. 2A and 2B illustrate a flowchart of an example process for power management according to an example embodiment of the present disclosure. Although the examples below are described with reference to the flow diagram illustrated in FIGS. 2A and 2B, it will be appreciated that many other methods of performing the acts associated with FIGS. 2A and 2B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In example 200, a power manager 112 receives three target times, one from an application 110A for 45 minutes, in this example a power settings application, one from an application 110B for three hours, in this example a music playing application, and one from an application 110C for 75 minutes, in this example a navigation application (block 202). In the example, the power manager 112 also receives a designation from the application 110A that the application 110C, a music playing application in this example, is an application from which target times are to be ignored (block 204). Next in the example, the power manager 112 must determine the active target time by selecting the largest target time of the three target times (Block 206). In this example, the largest time is the target time from application 110B for three hours and, as such, is selected as the active target time. Then, the power manager 208 determines if the active target time was received from an application that is designated to be ignored (Block 208). If yes, as in this example, then the power manager 112 selects the next largest target time of the three target times received as the active target time (blocks 210 and 212). In this example, the next largest target time received is from application 110C for 75 minutes, and is, as such, set as the active target time. Once again, the power manager 112 determines whether the active target time is from an application designated to be ignored (block 208).

In an example, after determining that no, the active target time is not from an ignored application, (block 214), the power manager 112 obtains a plurality of operating system requirements, current charge of the device battery 130, current component power usages, and current component performance parameters (block 218). In the example, hardware components 150 likely required and used by the applications include the CPU 114, memory storage 116, GPS 118, GPU 120, display 126, sound card 134, cellular modem 138, and the audio speaker 140. In an example, the power manager 112 determines an instantaneous power usage of the mobile device 102 by totaling the current component power usages for all hardware components 150 currently in use (block 218). In the example, the power manager 112 determines the remaining battery life of the device battery 130 by dividing the current charge of the battery 130 by the instantaneous power usage (block 220).

In an example, the power manager 112 then compares the remaining battery life of the device battery 130 to the active target time (block 222). If the remaining battery life is greater than that of the active target time (block 224), the power manager 112 may not make any changes to the mobile device 102 and, instead, await reception of new target times (block 226) at which the analysis in the example will begin anew (block 202).

In an example, the power manager 112 may determine that the active target time is greater than remaining battery life (block 228). In the example, the power manager may then request and receive, from the applications 110A-C, a plurality of application component requirements (block 230). For example, the power manager 112 may request from each of applications 110A-C a required component list detailing which of the hardware components 150 are required for that application's function, component target times for each of the required components, and the minimum performance parameter required of each of the required components. Note that although, in the prior example, the power manager 112 requested the application component requirements, alone, from the applications 110A-C, in another example, the power manager 112 may include, along with the request, other information such as current component performance parameters. In another example, the power manager 112 may reiterate the request, sending required component information about every other application 110A-C to every other application 110A-C to allow the applications 110A-C to devise a new set of application component requirements.

In an example, the power manager 112 may be configured to determine at least one component parameter reduction (block 234). For example, the power manager may group each of the application component requirements based on its relation to one of the hardware components 150. For example, if all three applications 110A-C require the CPU 114 and have provided their respective target times and minimum performance parameters for the CPU 114, the power manager 112 will group all of this information together into a single group that is one of a first set of groups. The power manager 112 can then perform a similar operation for each of the required components, creating a group within the first set of groups for each of the required components selected from the hardware components 150. In an example, there may be some required components that are only required by a single application; therefore, the group would only contain those requirements from that one application. In this example, once the application component requirements have been grouped together based on the related required component, the power manager 112 may determine a performance parameter that satisfies all of the requirements. For example, if application 110A, 110B, and 110C each have transmitted an application component requirement for the CPU 114 for 1% for 30 minutes, 20% for 22 minutes, and 15% for 45 minutes, the three requirements will be grouped due to their relation to the CPU 114. Then, the power manager 112 may determine a component parameter reduction for each of the required components. For example, using the values above, the power manager 112 may determine, through use of a lookup table, that, to satisfy all requirements, the proposed performance parameter for the CPU 114 should be 23% for the longest target time, 45 minutes. In the alternative, the system may determine that the proposed performance parameter may be 23% for only the first 22 minutes, then 16% for the next 8 minutes, then 15% for the remaining 15 minutes. For example, the power manager 112 may determine each of the component parameter reductions through use of heuristics, a lookup table developed based on component testing for each device model, or through artificial intelligence trained to determine such values In an example, the power manager 112 may determine a plurality of allowable power reduction options based on at least the at least one component parameter reduction and the plurality of operating system requirements (block 236). For example, each of the allowable power reduction options may be determined to satisfy all requirements of the operating system requirements and component parameter reductions found in a similar method as that used to determine at least one component parameter reduction in block 234.

In an example, the power manager 112 determines whether at least one option combination selected from the allowable power reduction options would increase the remaining battery life of the battery 130 to be at least equal to the active target time (block 240). In an example where at least one combination can satisfy the active target time (block 242), the power manager 112 determines a preferred option combination (block 244). In one example, this preferred combination may prefer options that reduce performance by as little as possible, essentially making the remaining battery life equal to the active target time even if further performance reductions could be executed. In another example, the power manager 112 may simply prefer all allowable power reductions to increase the remaining battery life to its maximum. Instructions on how to determine the preferred option combination may be set within a settings application, in this example 110A, and transmitted to and received by the power manager 112. In this example, once the preferred option combination is determined (block 244), the power manager then executes the preferred option combination (block 246) by relaying the commands to the applications 110A-C or hardware components 150 as needed.

In an example, the power manager may determine that there is no combination of allowable power reduction options that increase the battery life to at least that of the active target time (block 248). In this example, the power manager 112 may notify the user 104 that the mobile device 102 requires charging through any method available, such as text on display 126 or audible alerts via audio speaker 140 (block 250). Furthermore, in this example, the power manager 112 determines a plurality of selectable power options (block 252). In this example, the selectable options may include options to navigate to a different location than that currently set within the navigation application, navigate along a different path to the same location, navigate home, navigate to a nearby charger, or to end navigation. Each of the new navigation options may be determined to lie at least within an achievable range based on the remaining battery life after execution of all allowable power reduction options. Further options may include the option to end music playback, quiet music playback, remove the target time of the settings application or end all applications.

In an example, the selectable power options are then presented to the user 104 (block 254). In this example, the power manager 112 receives at least one user selected power reduction option (block 256) and executes the at least one user selected power reduction option (block 258).

Figure 3:
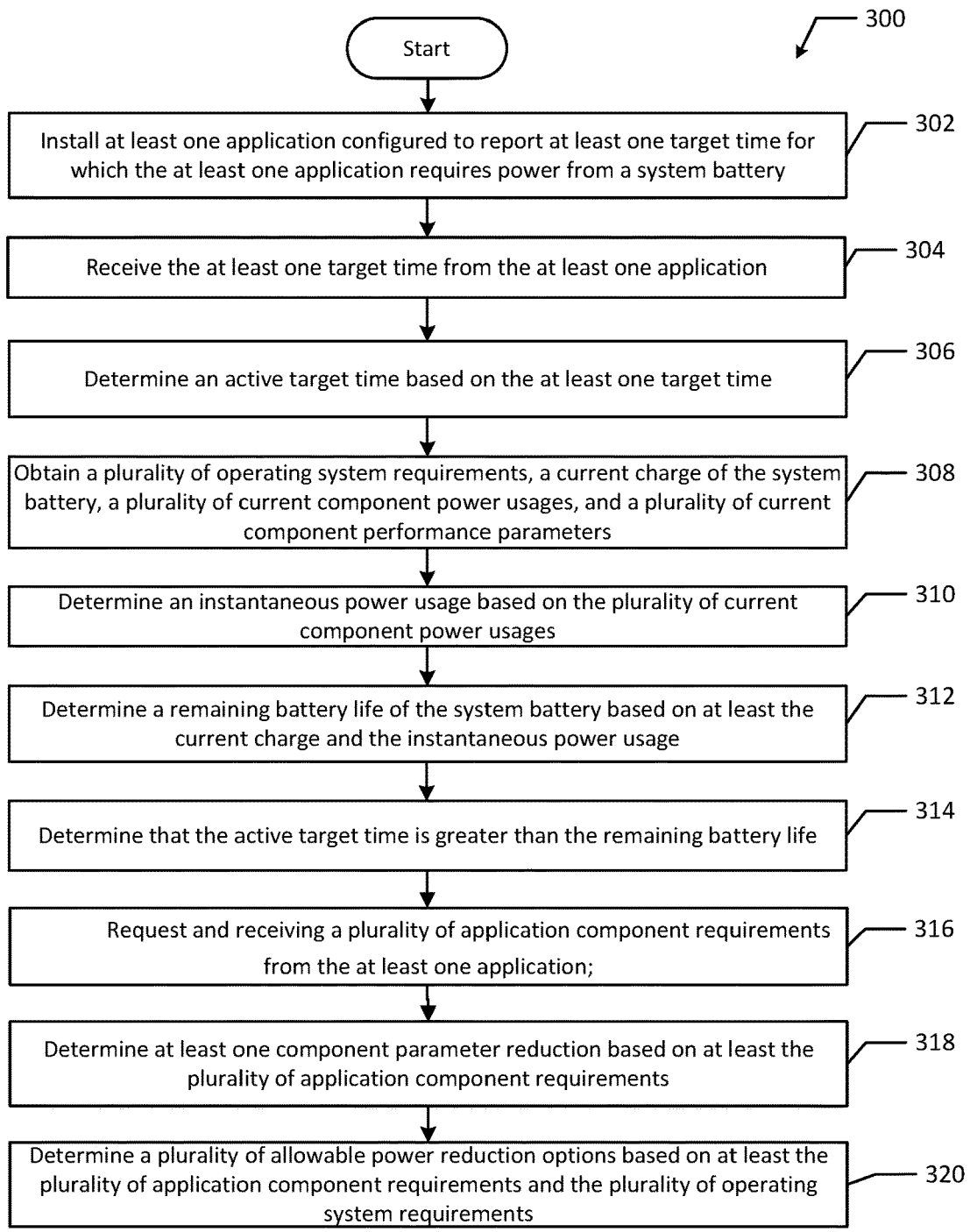
FIG. 3 illustrates a flowchart of an example process for power management according to an example embodiment of the present disclosure.
Figure 4A:
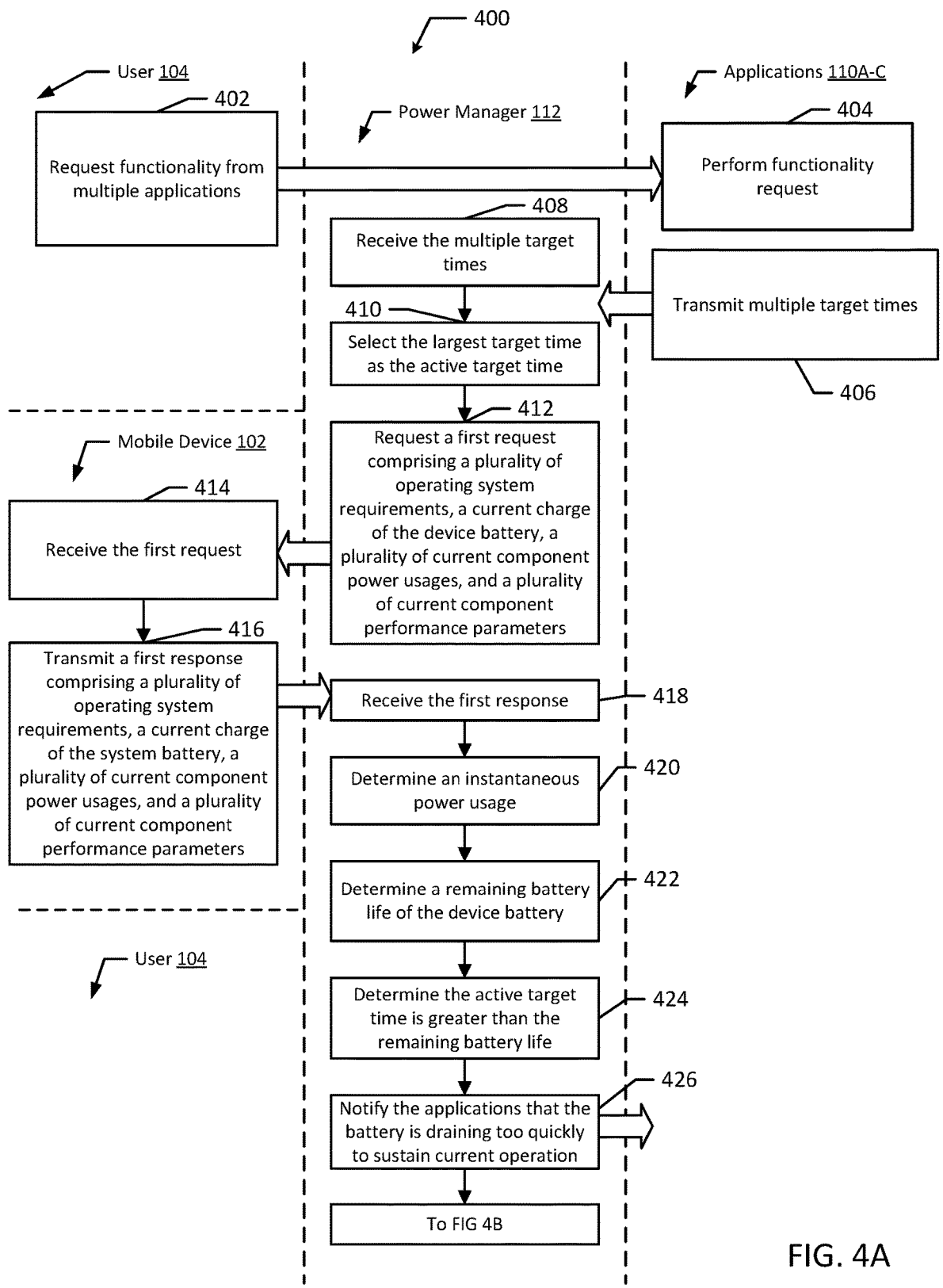
FIGS. 4A-D illustrate a flow diagram of an example process for power management according to an example embodiment of the present disclosure.
Figure 4B:
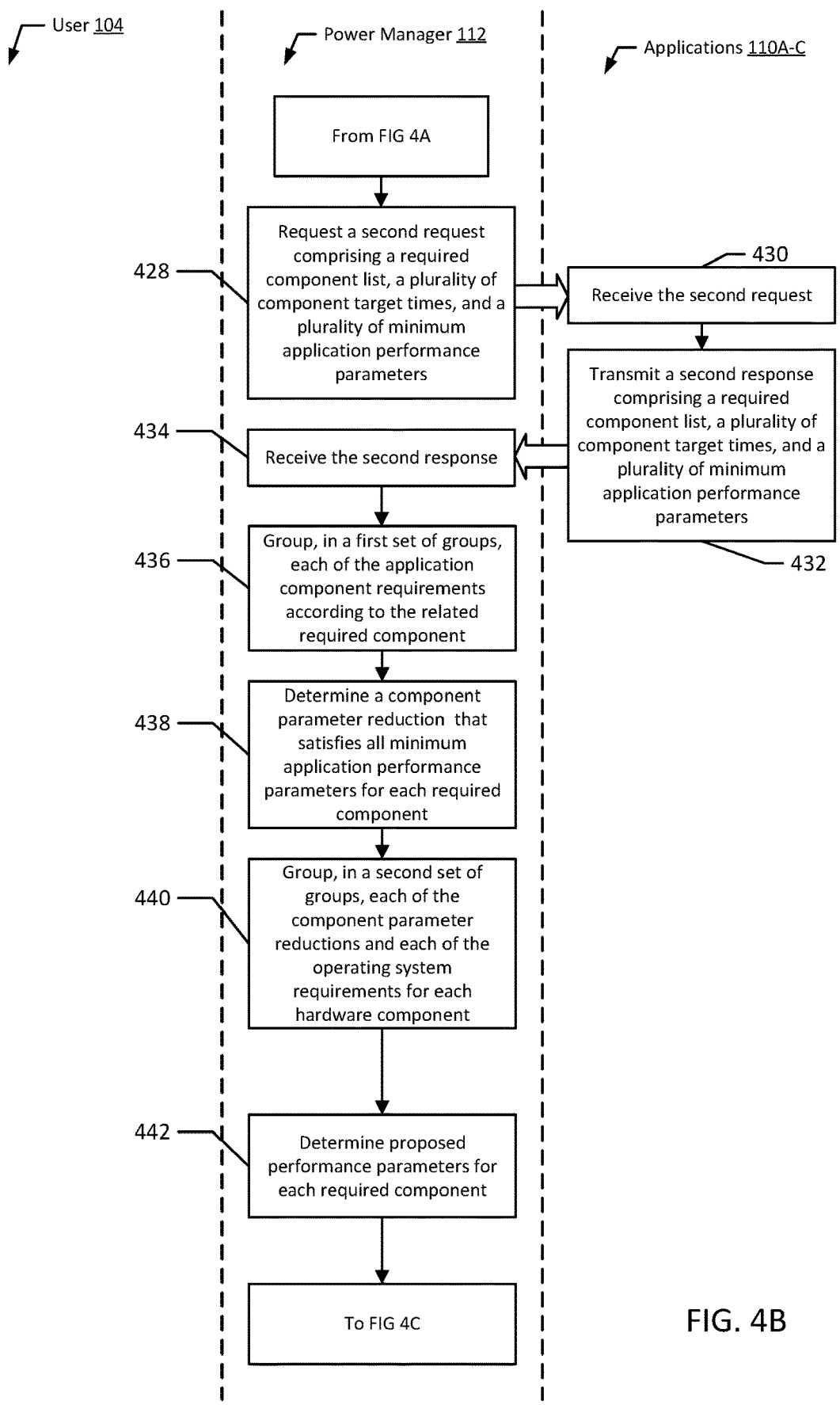
Figure 4C:
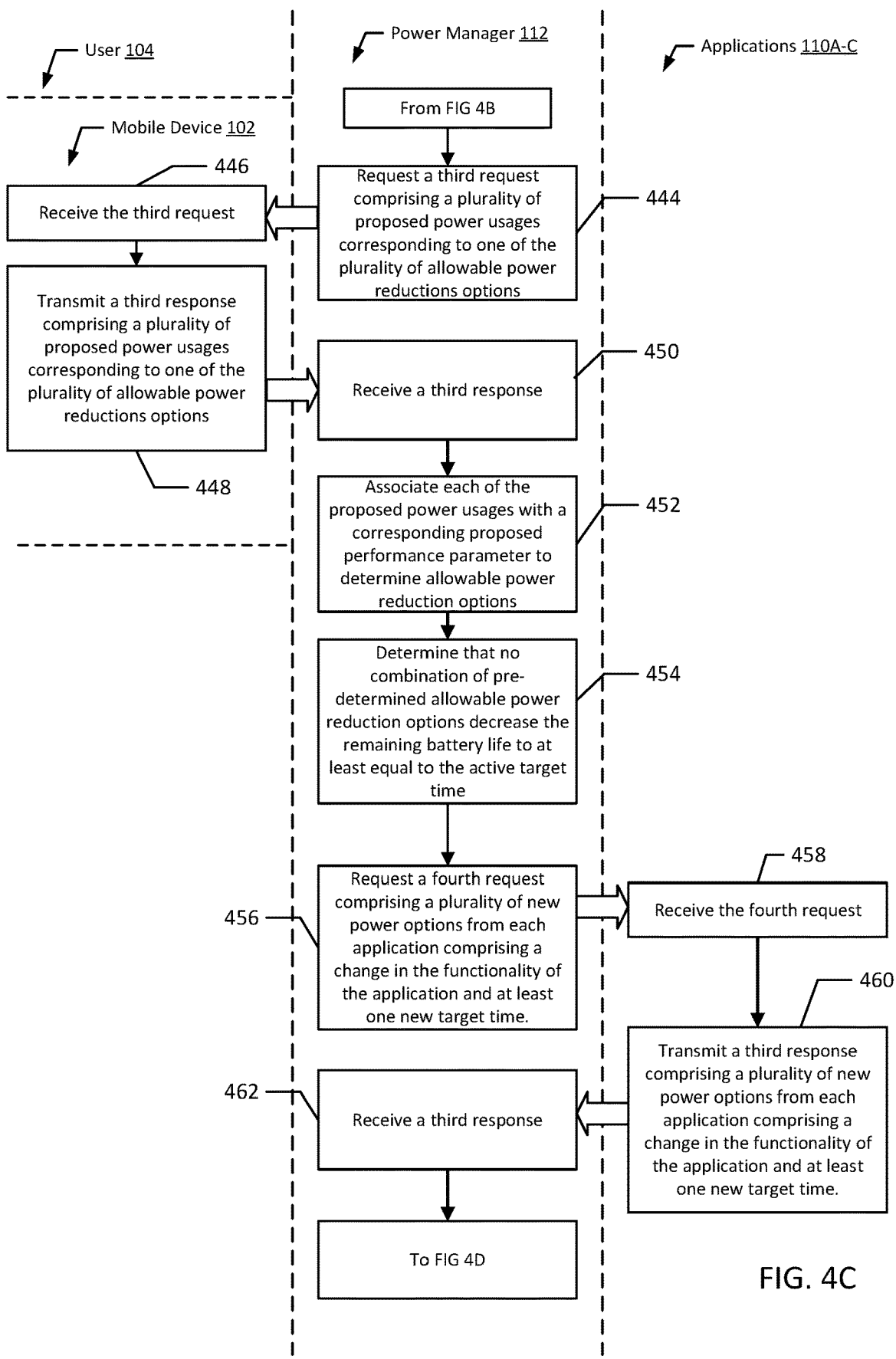
Figure 4D:
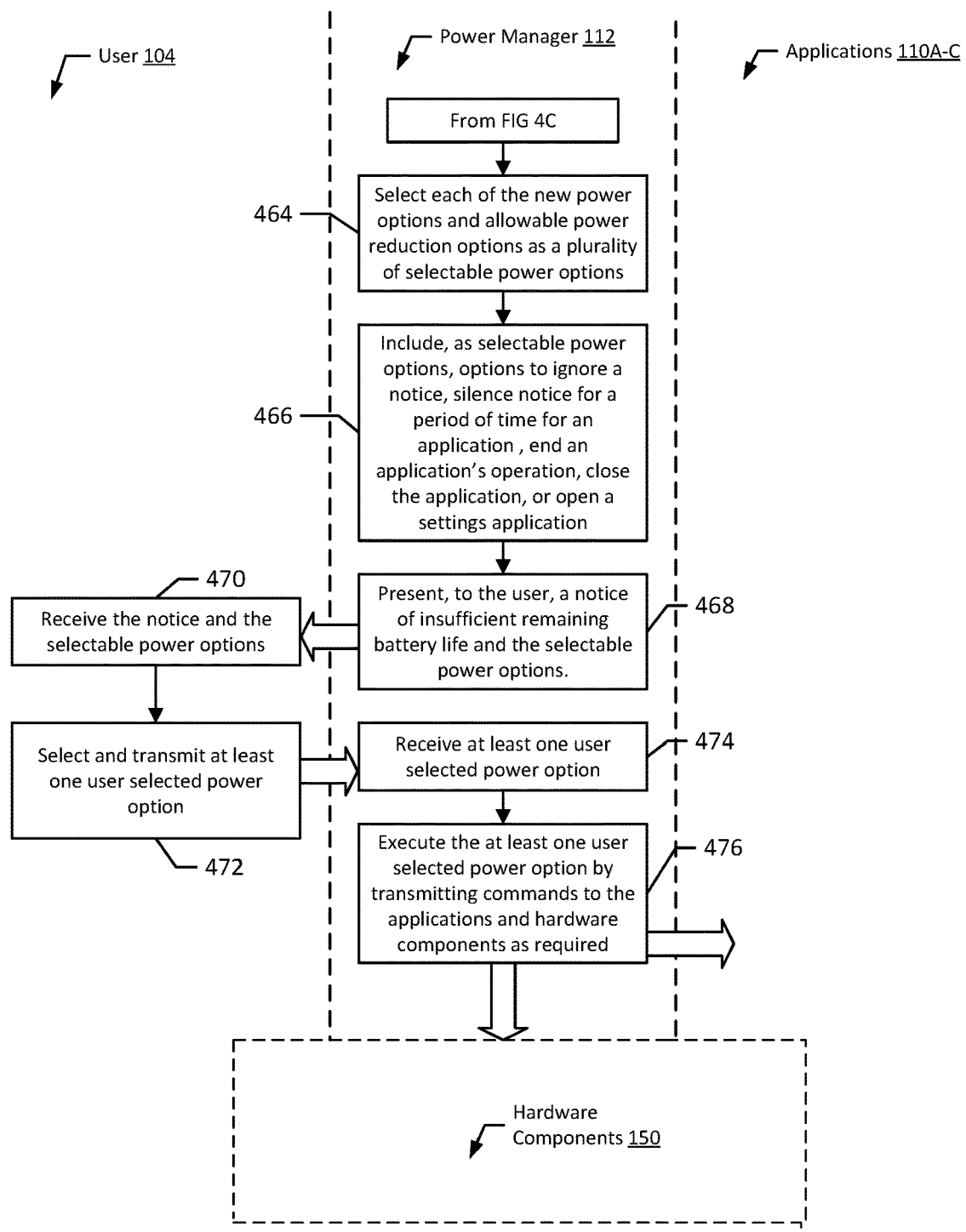

FIG. 3 illustrates an example embodiment of a method 300 of the presently disclosed method, as was discussed above in relation to the system 100. The method 300 may be implemented in system, such as the system 100, or on a CPU. For example, the method may be implemented by the power manager 112, CPU 114, the mobile device 102, any of the hardware components 150, or an application 110A-C. The method 300 may also be implemented by a set of instructions stored on a computer readable medium that, when executed by a processor, cause the computer system to perform the method. For example, all or part of the method 300 may be implemented by the CPU 114 and memory 116. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 may begin with installing at least one application configured to report at least one target time (block 302). At least one target time is received from the at least one application (block 304). An active target time is determined based on the at least one target time (block 306). For example, if three target times are received from the at least one applications 110A-C, the largest target time is determined to be the active target time. Then, operating system requirements, a current charge of the system battery, a plurality of current component power usages, and a plurality of current component performance parameters are obtained (block 308). Additionally, an instantaneous power usage is determined based on the plurality of current component power usages (block 310). For example, the instantaneous power usage may be determined to represent the sum of all current component power usages. A remaining battery life of the system battery is determined based on at least the current charge and the instantaneous power usage (block 312). For example, the remaining battery life may be determined as the current charge divided by the instantaneous power usage. The remaining battery life is determined to be less than the active target time (block 314). A plurality of application component requirements from the at least one application are requested and received (block 316). For example, the application component requirements may include a list of components, such as the CPU 114, display 126, microphone 146, and motion sensors 128 that are required for an application's functionality, as well as the performance parameter and target time related to each of those required components. At least one component parameter reduction is determined based on at least the plurality of application component requirements (block 318). For example, if multiple applications 110A-C provide requirements for the GPU 120, a performance parameter will be determined that satisfies all required performance parameters for their respective target times. A plurality of allowable power reduction options based on at least the plurality of application component requirements and the plurality of operating system requirements (block 320). For example, this plurality of application allowable power reduction options may include an option to reduce the CPU 114 operating performance to 25%, the GPU 120 operating performance to 37%, and the sound card 134 performance to 21%.

FIGS. 4A-D illustrate a flow diagram of an example process for power management according to an example embodiment of the present disclosure. Although the examples below are described with reference to the flow diagram illustrated in FIGS. 4A-D, it will be appreciated that many other methods of performing the acts associated with FIGS. 4A-D may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In example 400, a user 104 requests a certain functionality from multiple applications 110A-C (block 402). The applications 110A-C then perform the functionality request (block 404). For example, the user 104 may request that the plurality of applications 110A-C do one of the following, provide navigation to a location, play a song, and download a file. In an example, in response to performing the functionality request, the applications 110A-C transmits multiple target times corresponding to each function that has a known duration for which the function will persist (block 406). For example, the applications 110A-C may transmit a target time corresponding to the length of time navigation instructions are required, the length of the requested song, and the amount of time required to download a file.

In an example, the power manager 112 receives the multiple target times from the applications 110A-C (block 408). In the example, the power manager 112 determines an active target time by selecting the largest target time as the active target time (block 410). In an example, after determining the active target time, the power manager requests from the mobile device 102, in a first request, a plurality of operating system requirements, a current charge of the device battery, a plurality of current component power usages, and a plurality of current component performance parameters (block 412). In the example, the mobile device 102 receives the first request (block 414) and transmits a first response comprising a plurality of operating system requirements, a current charge of the system battery, a plurality of current component power usages, and a plurality of current component performance parameters. For example, the mobile device 102 may transmit operating system requirements including that the CPU 114 requires at least 13% performance, the memory storage 116 requires at least 5% performance, and the cellular modem 138 requires at least 8% performance. As a further example, the first response may also transmit information that the current charge of the battery 130 is 10 kJ, that current component power usage is 5 mW for each of the hardware components 150, and that the CPU 114, memory storage 116, and cellular modem 138 are currently operating at 22%, 19%, and 21%, respectively.

In an example, the power manager 112 receives the first response (block 418), and based on this response, determines an instantaneous power usage (block 420). In the example, based on the instantaneous power usage and current charge of the battery 130, the power manager determines the remaining life of the device battery (block 422). For example, the remaining life may be determined by simply dividing the current charge of the device battery 130 by the instantaneous power usage, through a lookup table developed based on the testing for the device, or through an artificial intelligence. In the example, the power manager 112 then determines that the active target time is greater than the remaining battery life, signifying that power reduction actions must be taken (block 424). In the example, the power manager 112 then notifies the applications 110A-C that the battery is draining too quickly to sustain current operation for the required length of time, designated by the active target time (block 426).

In an example, the power manager 112 requests a second request from the applications 110A-C comprising a required component a plurality of component target times, and a plurality of minimum application performance parameters (block 428). The applications 110A-C receive the second request (block 430) and transmit a second response comprising a plurality of component target times, and a plurality of minimum application performance parameters (block 432).

In an example, the power manager 112 receives the second response (block 434) and groups, in a first set of groups, each of the application component requirements according to the related required component (block 436). For example, if multiple applications 110A-C transmit application component requirements concerning the CPU 114, the power manager 112 will group these application component requirements concerning the CPU 114 into a group, separate from other application component requirements concerning different hardware components 150. In the example, the power manager 112 determines a component parameter reduction, for each group from the first set of groups, that satisfies all minimum application performance parameters (block 438). For example, if the applications 110A-C require the CPU for 10 minutes at 15%, 12 minutes at 9%, and 25 minutes at 20%, respectively, the power manager 112 may determine that, to satisfy the requirements, the CPU 114 must function at 44% for 10 minutes, followed by 29% for two minutes, and 20% for thirteen minutes. In another example, the power manager 112 may determine that the CPU 114 must function at 44% for the entire 25 minutes.

In another example, the application component requirements may include, along with the minimum application performance parameters, a plurality of preferred application performance parameters, each of which require more performance and power than the corresponding minimum application performance parameter. For example, an application 110A may include a minimum application performance parameter for the CPU 114 to perform at 25% of its maximum performance and also include a preferred application performance parameter for the CPU 114 to perform at 29% of its maximum performance. These preferred application performance parameters may be grouped in a different group from those of the minimum application performance parameters, but still in the first set of groups. For example, for each required component, there may be a first group containing minimum application performance parameters for the required component, and a second group containing preferred application performance parameters for the same component. In this example, the power manager 112 may determine a component parameter reduction for the required components by selecting one of the first or second group and determining a value that satisfies all of the performance parameters within that group. The power manager 112 may select which group based on heuristics, artificial intelligence, or any other method. For example, one method for selection selects the preferred parameters for the most recently used application and the minimum parameters for every other application. In this example, the power manager 112 then determines a component parameter reduction, based on the selected group, to be used in a corresponding second set of groups.

In another example, the power manager 112 may create a single group for each required component made from a selection of one of either the minimum application performance parameter or the preferred application performance parameter based on a selection method. For example, the selection method may always select the preferred application performance parameter when the CPU 114 is the related one of the hardware components 150. Another selection method could make use of a lookup table developed according to the hardware components 150 found in the hardware device 102 and the applications in use 110A-C. In another example, the power manager 112 determines a component parameter reduction for each of the required components by selecting one of either the minimum or preferred application performance parameters for each corresponding required component for each of the applications 110A-C and determining a value that satisfies all of the selected application performance parameters. For example, the power manager 112, through the use of artificial intelligence, could select the preferred application component parameter for the CPU 114 for each of the applications 110A and 110B, but select the minimum application component parameter for the application 110C. Then, the power manager 112 may determine a parameter reduction that satisfies all the application parameter reductions selected.

In an example, the power manager 112 groups, in a second set of groups, each of the component parameter reductions, determined based on the first set of groups, and each of the operating system requirements according to the relation to each of the hardware components 150 (block 440). For example, the operating system requirement relating to the CPU 114 will be grouped with the component parameter reduction that also relates to the CPU 114. The use of a second set of groups that is separate from the first allows the power manager 112 to determine appropriate component parameter reductions based on the applications' 110A-C requirements, compiled in groups within the first set of groups, alone. Then, once the power manager 112 has determined performance parameters that satisfy the application requirements, for example, through use of artificial intelligence or heuristics, the power manager then creates a second set of groups, grouping each of the component parameter reductions with a corresponding operating system requirement. In the example, the power manager 112 then determines an allowable power reduction option, through artificial intelligence or heuristics, for each of the hardware components 150 based on the second set of groups that satisfies all requirements of the operating system requirements and component parameter reductions found in each group (block 442). Though in the example, an allowable power reduction option is determined for each of the hardware components 150, in another example, allowable power reduction options may only be determined for the hardware components 150 that have corresponding component parameter reductions. In another example, allowable power reduction options may be determined for only a set number of components, selected within a power settings application or determined by any other prior ranking or designation. Though in the present example there exists a first and second set of groups and determining component parameter reductions and allowable power reduction options are separate, in another example, the operating system requirements may be grouped into corresponding groups within the first set of groups, and the determined component parameter reductions may be considered allowable power reduction options. For example, if there is only one application component requirement for any given one of the hardware components 150, the operating system requirements may be included in the first set of groups and forego creating a second set of groups.

In an example, the power manager 112 requests a third request from the mobile device 102 comprising a plurality of proposed power usages corresponding to one of the plurality of allowable power reductions options (block 444). In the example, the mobile device 102 receives the third request (block 446) and transmits a third response comprising a plurality of proposed power usages corresponding to one of the plurality of allowable power reductions options (block 448). For example, one proposed power usage, related to an allowable power reduction detailing that the CPU 114 will function at 44% for 25 minutes, may detail that such an action will use 1.9 kJ. In an example, the third response is received by the power manager 112 (block 450) and each of the proposed power usages within the third response are associated with the corresponding allowable power reduction option (block 452).

In an example, the power manager 112 determines that no combination of pre-determined allowable-power reduction options decrease the remaining battery life to at least equal to the active target time (block 454). For example, the power manager 112 may total all of the proposed power usages associated with allowable power reduction options and determine that there is not enough remaining battery life or current charge left within the device battery 130. In the example, the power manager 112 requests a fourth request from the applications 110A-C comprising new power options comprising a change in the functionality of the application and at least one new target time (block 456). In the example, the applications 110A-C receive the fourth request (block 458) and transmit a third response containing the requested information (block 460) which is received by the power manager 112 (block 462). For example, a new power option could include navigation along a new path or to a new destination, option to end navigation, to end song playback, to end video playback, to end download, to end Bluetooth streaming, to mute video related audio, or to close the application entirely.

In the example, the power manager 112 selects each of the new power options received from the applications 110A-C and the allowable power reduction options as selectable power options (block 464). Furthermore, in the example, the power manager 112 includes as additional selectable power options, options to ignore a notice, silence notice for a period of time for an application, end an application's operation, close the application, or open a settings application (block 466). In an example, the power manager 112 presents, to the user 104, a notice of insufficient remaining battery life and the selectable power options (block 468). In the example, the user 104 receives the notice and selectable power options (block 470) and proceeds to select and transmit at least one user selected power option from the selectable power options. For example, the user may select the option to ignore the notice and proceed with current operation. In the example, the power manager 112 receives the at least one selected power option (block 474) and executes the at least one power option by transmitting commands to the applications and hardware components as required (block 476).

In an example, the user 104 may select to ignore the notice and to maintain the current operation. Though this may cause the power manager 112 to do nothing at block 476, in another example, the power manager 112 may execute any and all of the allowable power reduction options in order to extend the remaining battery life.

Figure 5:
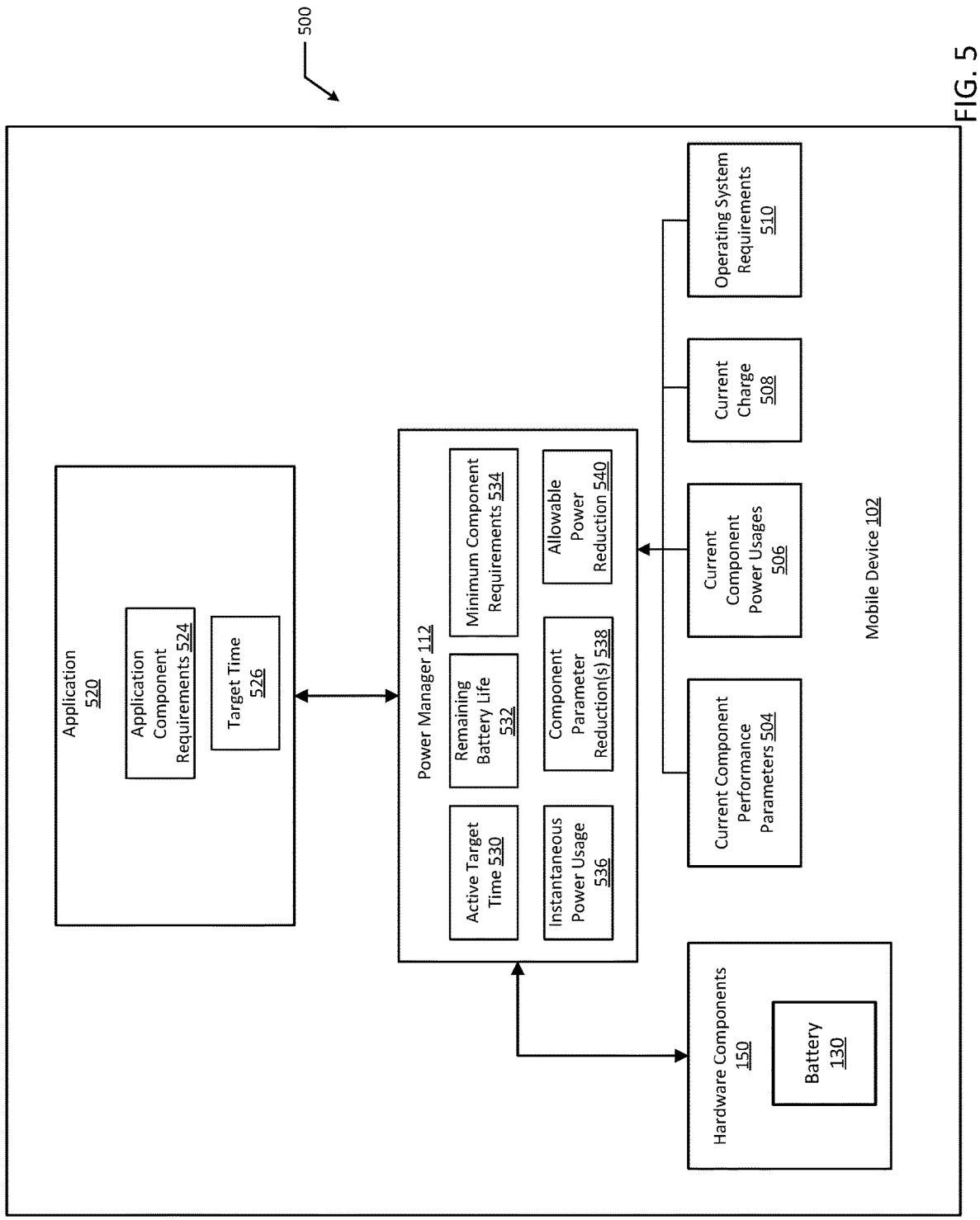
FIG. 5 illustrates a block diagram of an example system according to an example embodiment of the present disclosure.

FIG. 5 illustrates a block diagram of an example system according to an example embodiment of the present disclosure. A system 500 may comprise a mobile device 102. This mobile device 102 may comprise a plurality of hardware components 150, comprising a battery 130. The mobile device 102 may further comprise a power manager 122 and at least one application 520. The at least one application 520 may be configured to report at least one target time 526, respectively, for which the at least one application 520 requires power from the device battery 130. The power manager 112 receives the at least one target time 526 from the at least one application 520. Based on this at least one target time 526, the power manager 112 determines an active target time. Furthermore, the power manager 112 obtains a plurality of operating system requirements 510, a current charge of the device battery 508, a plurality of current component power usages 506, and a plurality of current component performance parameters 504. Based on the plurality of current component power usages 506 received, the power manager 112 determines an instantaneous power usage 536 and determines a remaining battery life 532 of the device battery 130 based on at least the current charge 508 and the instantaneous power usage 536. The power manager 112 determines that the active target time 530 is greater than the remaining battery life 532. In response to the active target time 530 begin greater than the remaining battery life 532, the power manager 112 requests and receives a plurality of application component requirements 524 from the at least one application 520. The power manager determines at least one component parameter reduction 538 based on at least the plurality of application component requirements 524. Based on the determined at least one parameter reduction 538 and the earlier obtained plurality of operating system requirements 510, the power manager 112 may also determine a plurality of allowable power reduction options.

The presently described systems and methods for managing the power of a mobile device allows a device, and therefore a user, to avoid situations in which certain functionality is required by the mobile device for a known amount of time, but the device will not sustain power delivery for the known amount of time. By creating options for power reduction based on the current and desired operation of the device the remaining battery life of the mobile device can be extended to ensure a user experiences the functionality of the mobile device as desired. In doing so, the power manager for mobile devices may ensure that the power of the battery is used only for hardware functions that are absolutely necessary, such as the required operation to maintain the operating system, and functions the user deems most important.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
    installing, by a mobile device comprising a plurality of hardware components, at least two applications configured to each report at least one respective target time for which each of the at least two applications respectively require power from a battery;
    receiving at least two target times from the at least two applications;

determining an active target time based on the at least two target times;

obtaining a plurality of operating system requirements, a current charge of the battery, a plurality of current component power usages, and a plurality of current component performance parameters;

determining an instantaneous power usage based on the plurality of current component power usages;

determining a remaining battery life of the battery based on at least the current charge and the instantaneous power usage;

determining that the active target time is greater than the remaining battery life;

requesting and receiving a plurality of application component requirements from the at least two applications;

determining at least one component parameter reduction based on at least the plurality of application component requirements;

determining a plurality of allowable power reduction options based on at least the at least one component parameter reduction and the plurality of operating system requirements; and executing at least one of the allowable power reduction options.

2. The method of claim 1, wherein requesting and receiving the plurality of application component requirements from the at least two applications comprises notifying the at least two applications the battery is draining too quickly to sustain current operation.

3. The method of claim 2, further comprising:

determining at least one option combination comprised of selections from the plurality of allowable power reduction options that, when executed, increases the remaining battery life to be at least equal to the active target time;

determining a preferred option combination based at least on the at least one option combination; and executing the preferred option combination.

4. The method of claim 2, further comprising:

determining that the execution of any combination of selections from the plurality of allowable power reduction options does not increase the remaining battery life to be at least equal to the active target time;

determining a plurality of selectable power options based on the at least two applications and the plurality of allowable power reduction options;

presenting, to a user, the plurality of selectable power options;

receiving at least one user selected power option; and executing the at least one user selected power option.

5. The method of claim 4, wherein determining the active target time based on the at least two target times comprises:

receiving a designation list comprising a list of applications from which to ignore target times;

determining a largest target time;

responsive to the largest target time being received from an application on the list of applications, iteratively selecting the next largest target time until the largest target time is no longer received from an application on the list of applications; and selecting the largest target time as the active target time.

6. The method of claim 5, wherein the plurality of operating system requirements comprises a plurality of minimum performance parameters containing a minimum performance parameter relating to each of the plurality of hardware components.

7. The method of claim 6, wherein the plurality of application component requirements comprises:

a required component list containing a plurality of required components that are required for the operation of the at least two applications, chosen from the plurality of hardware components;

a plurality of component target times containing a component target time for each one of the plurality of required components; and a plurality of minimum application performance parameters relating a minimum application performance parameter to each one of the plurality of required components.

8. The method of claim 7, wherein determining at least one component parameter reduction based on at least the plurality of application component requirements comprises:

grouping, in a first set of groups, each of the plurality of application component requirements based on its relation to one of the plurality of required components; and determining a component parameter reduction for each of the plurality of required components based on the first set of groups.

9. The method of claim 8, wherein determining the plurality of allowable power reduction options based on at least one component parameter reduction and the plurality of operating system requirements comprises:

grouping, in a second set of groups, each of the at least one component parameter reduction and each of the plurality of operating system requirements based on its relation to one of the plurality of hardware components;

determining a plurality of proposed performance parameters for each of the plurality of hardware components based on the second set of groups; and obtaining a proposed power usage for each of the proposed performance parameters.

10. The method of claim 9, wherein obtaining the proposed power usage for each of the proposed performance parameters comprises:

requesting and receiving, from the at least two applications or a lookup table, a plurality of proposed power usages, each of which corresponds to one of the plurality of allowable power reduction options; and associating each of the plurality of proposed power usages to the corresponding one of the plurality of allowable power reduction options.

11. The method of claim 10, wherein determining a preferred option combination based at least on the at least one option combination comprises selecting a preferred option combination from the at least one option combination based on a pre-determined hierarchy of application rankings.

12. The method of claim 10, wherein determining a preferred option combination based at least on the at least one option combination comprises selecting a preferred option combination from the at least one option combination based on which of the at least two applications has been launched most recently.

13. The method of claim 10, wherein determining that the execution of any combination of selections from the plurality of allowable power reduction options does not increase the remaining battery life to be at least equal to the active target time comprises notifying a user that the mobile device requires charging to ensure mobile device operation for at least as long as the at least two target times.

14. The method of claim 11, wherein determining the plurality of selectable power options based on the at least two applications and the plurality of allowable power reduction options comprises:

requesting a plurality of new power options, from each of the at least two applications, each of which comprises a change in application functionality and at least one new target time; and selecting, as the plurality of selectable power options each of the plurality of new power options and the plurality of allowable power reduction options.

15. The method of claim 14, wherein the plurality of selectable power options comprises options to ignore the notice, silence the notice for a period of time, end any of the at least two applications, and open a settings application.

16. The method of claim 15, wherein the at least two applications comprises a navigation application providing instruction to follow a first path and the plurality of new power options received from the navigation application comprises changing the functionality of the navigation application to provide instruction to follow a second path, this new power option having a new target time less than that of the remaining battery life.

17. The method of claim 16, wherein the at least two applications comprises a power settings application in which the user sets the target time for the power settings application.

18. The method of claim 17 wherein the power settings application designates at least one application for which a corresponding target time cannot be selected as the active target time.

19. A system comprising:
a mobile device comprising:
a plurality of hardware components comprising a battery;
at least two applications configured to each report at least one respective target time for which each of the at least two applications respectively require power from the battery;
a plurality of hardware components; and
a power manager configured to:
receive at least two target times from the at least two applications;
determine an active target time based on the at least two target times;
obtain a plurality of operating system requirements, a current charge of the battery, a plurality of current component power usages, and a plurality of current component performance parameters;
determine an instantaneous power usage based on the plurality of current component power usages;
determine a remaining battery life of the battery based on at least the current charge and the instantaneous power usage;
determine that the active target time is greater than the remaining battery life;
request and receive a plurality of application component requirements from the at least two applications;
determine at least one component parameter reduction based on at least the plurality of application component requirements;
determine a plurality of allowable power reduction options based on at least at least one component parameter reduction and the plurality of operating system requirements; and
execute at least one of the allowable power reduction options.

20. A non-transitory, computer-readable medium storing instructions which, when performed by a processor, cause the processor to:
install at least two applications configured to each report at least one respective target time for which each of the at least two applications respectively require power from a battery;
receive at least two target times from the at least two applications;
determine an active target time based on the at least two target times;
obtain a plurality of operating system requirements, a current charge of the battery, a plurality of current component power usages, and a plurality of current component performance parameters;
determine an instantaneous power usage based on the plurality of current component power usages;
determine a remaining battery life of the battery based on at least the current charge and the instantaneous power usage;
determine that the active target time is greater than the remaining battery life;
request and receive a plurality of application component requirements from the at least two applications;
determine at least one component parameter reduction based on at least the plurality of application component requirements;
determine a plurality of allowable power reduction options based on at least the at least one component parameter reduction and the plurality of operating system requirements; and
execute at least one of the allowable power reduction options.

* * * * *